(12) United States Patent
Chen et al.

(10) Patent No.: US 12,506,136 B2
(45) Date of Patent: Dec. 23, 2025

(54) ELECTRODE PLATE FORMING APPARATUS

(71) Applicant: CONTEMPORARY AMPEREX TECHNOLOGY (HONG KONG) LIMITED, Hong Kong (CN)

(72) Inventors: Shitong Chen, Ningde (CN); Bin Xie, Ningde (CN); Yi Lu, Ningde (CN); Xinlu Fei, Ningde (CN); Keqiang Li, Ningde (CN); Fenggang Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 191 days.

(21) Appl. No.: 18/435,895

(22) Filed: Feb. 7, 2024

(65) Prior Publication Data

US 2024/0243245 A1 Jul. 18, 2024

Related U.S. Application Data (63) Continuation of application No. PCT/CN2022/121048, filed on Sep. 23, 2022.

(30) Foreign Application Priority Data

Nov. 29, 2021 (CN) .......................... 202111433515.7

(51) Int. Cl.
H01M 4/04 (2006.01)
(52) U.S. Cl.
CPC ................ *H01M 4/0435* (2013.01)
(58) Field of Classification Search
CPC .. H01M 4/0435; H01M 4/139; H01M 10/052; H01M 10/0525; H01M 10/0587;
(Continued)

(56) References Cited

U.S. PATENT DOCUMENTS

2008/0248386 A1* 10/2008 Obrovac ............. H01M 10/052
205/50
2011/0179926 A1* 7/2011 Hung ...................... H01M 4/04
83/522.11
(Continued)

FOREIGN PATENT DOCUMENTS

CN 203466256 U 3/2014
CN 107123785 A 9/2017
(Continued)

OTHER PUBLICATIONS

The World Intellectual Property Organization (WIPO) International Search Report for PCT/CN2022/121048 Dec. 15, 2022 7 pages (including English translation).
(Continued)

*Primary Examiner* — Nahida Sultana
(74) *Attorney, Agent, or Firm* — ANOVA LAW GROUP, PLLC (57) ABSTRACT

An electrode plate forming apparatus includes an unwinding device, a lithium replenishment device, a plurality of winding devices and a protection device. The lithium replenishment device is configured to clad a lithium strip to a surface of a master electrode plate body and form a master electrode plate. A slitting device is configured to slit the master electrode plate into a plurality of electrode plates. The winding devices are configured to pull the electrode plates to travel, each of the winding devices winding one corresponding electrode plate. The slitting device is disposed in an accommodating cavity of the protection device. The protection device is configured to at least partially separate particles from an external environment in a case that the slitting device slits the master electrode plate and generates the particles.

10 Claims, 5 Drawing Sheets

(58) Field of Classification Search
CPC ......... H01M 4/04; B26D 7/088; B23D 19/00; Y02E 60/10; B23P 23/06
See application file for complete search history.

(56) References Cited

U.S. PATENT DOCUMENTS

| | | | |
|---|---|---|---|
| 2015/0147602 A1 | 5/2015 | Bianchi et al. | |
| 2019/0280339 A1* | 9/2019 | Kano | H01M 4/661 |
| 2023/0352744 A1* | 11/2023 | Wei | H01M 50/44 |

FOREIGN PATENT DOCUMENTS

| | | | |
|---|---|---|---|
| CN | 109360943 A | 2/2019 | |
| CN | 211757322 U | 10/2020 | |
| CN | 212434665 U | 1/2021 | |
| CN | 112475415 A | 3/2021 | |
| CN | 113020399 A | 6/2021 | |
| CN | 112563444 B | 8/2022 | |
| DE | 202011108555 U1 | 2/2012 | |
| EP | 3907031 A1 | 11/2021 | |
| KR | 20080064916 A | 7/2008 | |
| KR | 101920850 B1 | 11/2018 | |
| WO | WO-2015145806 A1 * | 10/2015 | H01M 4/13 |

OTHER PUBLICATIONS

State Intellectual Property Office of China the First Office Action or Application No. 202111433515.7, Aug. 4, 2025 19 pages (including translation).

Guoying Zhao, Efficient Milling Technology and Applications, Mechanical Industry Press, May 2016, pp. 141-142.

Practical Electrical Engineering Design Manual, Edited by Shanghai Electrical Engineering Design Research Association, Shanghai Science and Technology Literature Publishing House, Jun. 2011, pp. 590-591.

The European Patent Office (EPO) the Extended European Search Report for Application No. 22897348.3 Oct. 28, 2024 10 Pages.

* cited by examiner

ELECTRODE PLATE FORMING APPARATUS

CROSS-REFERENCE TO RELATED APPLICATIONS

The present application is a continuation of International Application No. PCT/CN2022/121048, filed on Sep. 23, 2022, which claims priority to a Chinese Patent Application 202111433515.7 entitled "ELECTRODE PLATE FORMING APPARATUS" filed on Nov. 29, 2021, the entire contents of both of which are incorporated herein by reference.

TECHNICAL FIELD

The present application relates to the technical field of electrode plate production, and in particular, to an electrode plate forming apparatus.

BACKGROUND

Batteries are widely used in electrical devices, such as mobile phones, notebook computers, battery cars, electric cars, electric planes, electric ships, electric toy cars, electric toy ships, electric toy planes and electric tools. Batteries can include nickel-cadmium batteries, nickel-hydrogen batteries, lithium-ion batteries and secondary alkaline zinc-manganese batteries.

In the development of battery technologies, electrode plates are important parts of the batteries. Safety problems are prone to occurring in the production process of the electrode plates, and thus how to ensure safety in the production process of the electrode plates is a technical problem that has been continuously researched in the battery technologies.

SUMMARY

Provided in the present application is an electrode plate forming apparatus, which can improve safety in the production process of electrode plates.

The present application provides an electrode plate forming apparatus, which includes: an unwinding device, configured to dispose a master electrode plate body; a lithium replenishment device, configured to clad a lithium strip to a surface of the master electrode plate body and form a master electrode plate; a slitting device, configured to slit the master electrode plate into a plurality of electrode plates; a plurality of winding devices, configured to pull the electrode plates to travel, each of the winding devices winding one corresponding electrode plate; and a protection device, provided with an accommodating cavity in which the slitting device is disposed, and configured to at least partially separate particles from an external environment in a case that the slitting device slits the master electrode plate and generates the particles.

According to the electrode plate forming apparatus provided by the present application, by disposing the protection device and providing the protection device with the accommodating cavity in which the slitting device is disposed, air content at a slitting place of the master electrode plate can be effectively reduced, thereby reducing the risk of combustion of lithium particles or other particles generated by slitting, i.e., reducing the risk of sparking at the slitting place of the master electrode plate, and effectively improving the safety in the production process of the electrode plates. In addition, the accommodating cavity can prevent at least part of the particles from splashing to the outside of the accommodating cavity, such that environment cleanliness in the production process of the electrode plates can be effectively improved, and meanwhile the structural integrity of the electrode plates is improved, thereby improving the work safety of the electrode plates in the subsequent using process.

In some embodiments, the protection device includes a cover body with the accommodating cavity formed therein. The cover body is provided with an electrode plate inlet and an electrode plate outlet oppositely disposed. The electrode plate inlet is configured to allow the master electrode plate to enter the accommodating cavity, and the electrode plate outlet is configured to allow the slit electrode plates to be pulled out from the accommodating cavity. As such, the particles splashed into the environment can be further reduced, thereby reducing the risk of excessively high content of dust in the environment, and meanwhile the content of the lithium particles in air is reduced, which is conducive to reducing the risk of explosion after the lithium particles encounter an open fire.

In some embodiments, the electrode plate forming apparatus further includes a negative pressure device. The negative pressure device is configured to suck air in the accommodating cavity. The provision of the negative pressure device can effectively ensure that the air content in the accommodating cavity is maintained within a preset range, thereby further reducing the risk of sparking at the slicing place of the master electrode plate.

In some embodiments, the electrode plate forming apparatus further includes an inert gas input device communicating with the accommodating cavity. The inert gas input device is configured to input inert gas into the accommodating cavity. As such, the risk of sparking in the slitting process of the master electrode plate is further reduced.

In some embodiments, the inert gas input device includes: an input pipeline, communicating with the accommodating cavity for inputting the inert air into the accommodating cavity; an output pipeline, communicating with the accommodating cavity for outputting the inert air in the accommodating cavity; and a cooling and pumping unit, disposed outside the accommodating cavity, the cooling and pumping unit communicating with the input pipeline and the output pipeline, for cooling the inert air and supplying power to circular flow of the inert air between the accommodating cavity and the cooling and pumping unit. By arranging in this way, activity efficiency of lithium films on the surfaces of the electrode plates can be effectively kept, thereby ensuring electrical performance of the electrode plates in the subsequent using process. Meanwhile, the risk of rubbing sparking of the electrode plates can also be reduced.

In some embodiments, the inert gas input device further includes a filter unit. The filter unit is disposed between the output pipeline and the cooling and pumping unit and configured to filter the inert gas. By providing the filter unit, purity of the inert gas can be increased, which is conducive to ensuring the protection effect of the inert gas on performance stability of the electrode plates. Meanwhile, the damage caused by the particles generated in the slitting process of the master electrode plate to the cooling and pumping unit is reduced, and the risk of the damage to the electrode plates from the particles entering the accommodating cavity along with the inert gas is reduced.

In some embodiments, the electrode plate forming apparatus further includes a particle collecting device communicating with the accommodating cavity. The particle collecting device is configured to collect the particles in the accommodating cavity. The risk of production environment cleanliness reduction of the electrode plates caused by the particles in the accommodating cavity drifting into the external environment is reduced. And through the particle collecting device, centralized treatment of the particles generated in the slitting process of the master electrode plate is also facilitated.

In some embodiments, the particle collecting device includes: a dust suction assembly, communicating with the accommodating cavity for sucking the particles in the accommodating cavity; and a filter assembly, communicating with the dust suction assembly for filtering out the particles sucked by the dust suction assembly. The provision of the dust suction assembly can more efficiently suck out the particles in the accommodating cavity. Whereas, the provision of the filter assembly is conducive to filtering out the particles from a mixture of the gas and the particles sucked out by the dust suction assembly to effectively separate the gas from the particles. As such, it is more convenient to collect the particles generated by slitting the master electrode plate.

In some embodiments, the electrode plate forming apparatus further includes an electric lead. The electric lead electrically connects the particle collecting device with a ground for eliminating static electricity of the particle collecting device. By arranging in this way, the risk of rubbing sparking of the particles can be further reduced.

In some embodiments, the slitting device includes a cutter, the cutter being configured to slit the master electrode plate. The electrode plate forming apparatus further includes a demoulding device, the demoulding device being configured to spray a mould release agent to the cutter; and/or, the electrode plate forming apparatus further includes a lubricating device, the lubricating device being configured to spray a lubricant to the cutter.

The provision of the demoulding device, the risk that the cutter adheres to the electrode plates in the process of slitting the master electrode plate can be effectively reduced. Whereas, the provision of the lubricating device can reduce the temperature of the cutter, and also, can ensure normal work of the cutter.

BRIEF DESCRIPTION OF DRAWINGS

In order to more clearly illustrate the technical solutions in embodiments of the present application, the following will briefly introduce the drawings that are desired to be used in the embodiments of the present application. Obviously, the drawings in the following description are merely some embodiments of the present application, from which other drawings may be obtained without exerting inventive effort by those ordinarily skilled in the art.

In the drawings, the drawing are not necessarily drawn to actual scale.

ILLUSTRATIONS OF REFERENCE NUMERALS

1. unwinding device; 2. lithium replenishment device; 3. slitting device; 31. cutter; 4. winding device; 5. protection device; 51. cover body; 51a. accommodating cavity; 51b. electrode plate inlet; 51c. electrode plate outlet; 6. negative pressure device; 7. inert gas input device; 71. input pipeline; 72. output pipeline; 73. cooling and pumping unit; 74. filter unit; 8. particle collecting device; 81. dust suction assembly; 82. filter assembly; 91. demoulding device; 92. lubricating device; 10. electric lead;

200. master electrode plate body; 210. master electrode plate; 211. electrode plate.

DETAILED DESCRIPTION OF EMBODIMENTS

Embodiments of the present application are described in further detail below with reference to the accompanying drawings and embodiments. The following detailed description of the embodiments and the accompanying drawings are used to exemplify the principles of the present application, but are not intended to limit the scope of the present application, i.e., the present application is not limited to the described embodiments.

In the description of the present application, it should be noted that, unless otherwise stated, "a plurality of" means more than two. The terms "up", "down", "left", "right", "inside", "outside" and the like indicate orientations or positional relationships for ease of description and simplification of the description only and are not intended to indicate or imply that the device or element in question needs to have a particular orientation, be constructed and operate in a particular orientation and therefore cannot be construed as limiting to the present application. In addition, the terms of "first", "second", "third" and the like are for descriptive purposes only and cannot be construed as indicating or implying relative importance. "Perpendicular" is not vertical in the strict sense, but within the allowable range of errors. "Parallelism" is not parallel in the strict sense, but within the allowable range of errors.

The locative words appearing in the following description are all directions shown in the figure and are not intended to limit the specific structure of the present application. In the description of the present application, it should be noted that the terms "install", "connect" and "couple" are to be understood in a broad sense, unless otherwise expressly specified and limited, for example, it may refer to a fixed connection, may also refer to a detachable connection, or may refer to an integral connection; it may refer to a direct connection or an indirect connection via an intermediate medium. For those ordinarily skilled in the art, the specific meanings of the above terms in the present application will be understood according to the specific circumstances.

Batteries, such as lithium-ion secondary batteries, lithium-ion primary batteries, lithium-sulfur batteries, sodium-lithium ion batteries, sodium ion batteries or magnesium ion batteries, etc., have the advantages of high energy density, high power density, multiple recycling times, long storage time, etc., and have been widely used in electrical devices suitable for batteries. For example, the electrical device may be a vehicle, a mobile phone, a portable device, a notebook computer, a ship, a spacecraft, an electric toy, an electric tool, and the like. Vehicles may be fuel vehicles, gas vehicles or new energy vehicles, and new energy vehicles may be pure electric vehicles, hybrid vehicles or extended-range vehicles; Spacecraft include airplanes, rockets, space shuttles and spaceships, etc.; Electric toys include fixed or mobile electric toys, such as game machines, electric car toys, electric ship toys, electric plane toys and so on; Electric tools include metal slitting electric tools, grinding electric tools, assembly electric tools and railway electric tools, such as electric drills, electric grinders, electric wrenches, electric screwdrivers, electric hammers, impact electric drills, concrete vibrators and planers, etc.

In the production process of battery, the electrode plates of battery need to go through coating, rolling, drying, slitting and other processes, and some electrode plates need to be supplemented with lithium.

It was found by the application that in the production process of the electrode plates, sparks are generated at a slitting place of a master electrode plate in the process of slitting the master electrode plate into the electrode plates. With regard to this, the inventor has carefully studied the production process of the electrode plates, and the results shown that since the a lithium strip is cladded to the surface of the master electrode plate, scrap lithium is inevitably generated at a slitting place in the process of cutting the master electrode plate by the slitter. Whereas, as the working time of the slitter increases, the slitter constantly rubs against the master electrode plate, and the surface temperature of the slitter gradually increases. Coupled with heat generated by rubbing, rubbing slitting places of the scrap lithium and the slitting device are combined with oxygen in air in a relatively high temperature environment, a chemical reaction of combustion occurs, and sparks are generated. As a result, safety in the production process of the electrode plates is seriously affected. In addition, particles generated in the production process of the electrode plate can be splashed into the air, and in particular, onto the electrode plates. As a result, the particles remain on the surfaces of the electrode plates and generate concave-convex electricity on the surfaces of the electrode plates. The electrode plates can be punctured in the subsequent using process. The punctured electrode plates are prone to the risk of short-circuited sparking in the using process.

Based on the above problems found by the inventor, the inventor improves the structure of the electrode plate forming apparatus. The technical solution described in the embodiments of the present application is applicable to the electrode plate forming apparatus.

Figure 1:
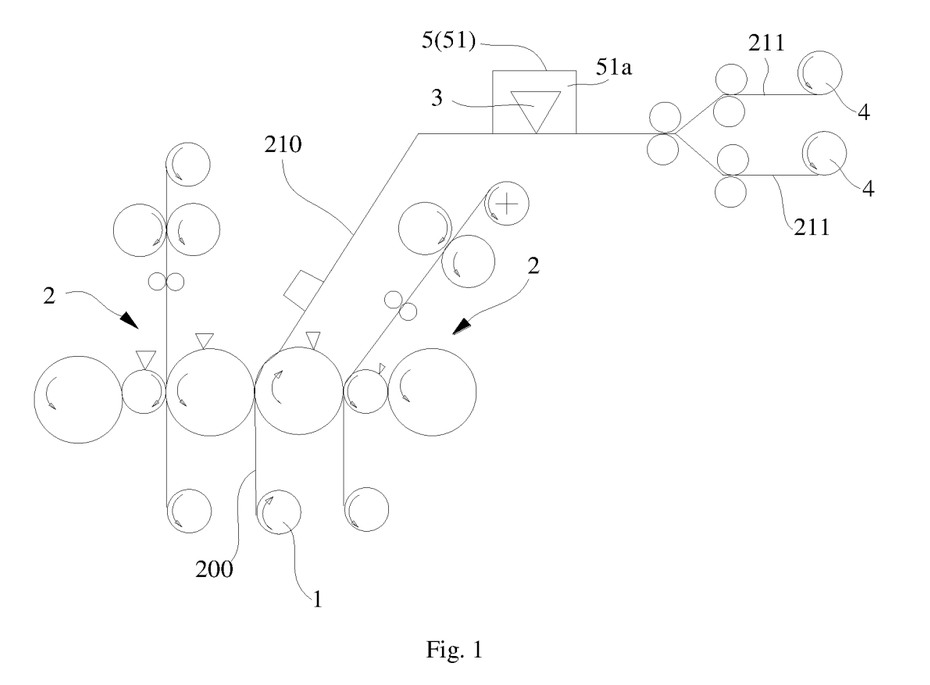
FIG. 1 is a schematic structural diagram of an electrode plate forming apparatus provided by an embodiment of the present application.

FIG. 1 shows a schematic structural diagram of an electrode plate forming apparatus provided by an embodiment of the present application.

According to the electrode plate forming apparatus provided by the embodiment of the present application, the electrode plate forming apparatus includes an unwinding device 1, a lithium replenishment device 2, a slitting device 3, a plurality of winding devices 4 and a protection device 5. The unwinding device 1 is configured to dispose a master electrode plate body 200. The lithium replenishment device 2 is configured to clad a lithium strip to a surface of the master electrode plate body 200 and form a master electrode plate 210. The slitting device 3 is configured to slit the master electrode plate 210 into a plurality of electrode plates 211. The plurality of winding devices 4 are configured to pull the electrode plates 211 to travel, and each winding device 4 winds one corresponding electrode plate 211. The protection device 5 is provided with an accommodating cavity 51a in which the slitting device 3 is disposed, and configured to at least partially separate particles from an external environment in a case that the slitting device 3 slits the master electrode plate 210 and generates the particles.

The lithium strip is cladded to the surface of the master electrode plate body 200 to form the master electrode plate 210, and a lithium film is formed on a surface of the master electrode plate 210. The slitting device 3 can slit the master electrode plate 210 into the plurality of electrode plates 211 in a manner of rubbing against and slitting the master electrode plate 210. In this process, the slitting device 3 inevitably rubs against the lithium film.

The slitting device 3 is disposed in the accommodating cavity 51a, but not all structures of the slitting device 3 are disposed in the accommodating cavity 51a. As long as the portion of the slitting device 3 slitting the master electrode plate 210 to form the electrode plates 211 is located in the accommodating cavity 51a to ensure that the slitting process of the master electrode plate 210 is performed in the accommodating cavity 51a, other structures cannot be disposed in the accommodating cavity 51a.

Particles generated in the process of slitting the master electrode plate 210 by the slitting device 3 also include other particles, in addition to lithium particles. Lithium has relatively high chemical activity, and thus is relatively prone to being combined with oxygen in air to generate sparks and release heat in a relatively high temperature environment. Certainly, the other particles other than the lithium particles may also generate sparks in the relatively high temperature environment, depending on a specific material of the master electrode plate body 200.

Specifically, the accommodating cavity 51a of the protection device 5 can be sealed, and can also be semi-closed. The slitting device 3 is located in the accommodating cavity 51a, it is difficult for the air from the external environment to enter the accommodating cavity 51a, or the amount of the air entering the accommodating cavity 51a is limited, and thus in the process of rubbing against and slitting the lithium film by the slitting device 3, the concentration of the air in the accommodating cavity 51a is relatively small. Even if the temperature of a rubbing slitting place of the lithium film by the slitting device 3 is relatively high, it is also relatively difficult for the lithium particles or the other particles generated at the rubbing slitting place to generate a combustion reaction because there is not enough oxygen.

In addition, since the slitting device 3 is located in the accommodating cavity 51a, the master electrode plate 210 is slit in the accommodating cavity 51a, and the generated particles can be at least partially blocked by the accommodating cavity 51a, thus reducing the risk that the particles are splashed into the external environment and also reducing the risk that the particles are splashed onto the electrode plates 211. As such, it is difficult for the particles to damage the electrode plates 211, which reduces the risk of the electrode plates 211 being punctured, thereby reducing the risk that the electrode plates 211 is short-circuited in the using process.

According to the electrode plate forming apparatus provided by the embodiment of the present application, by disposing the protection device 5 and providing the protection device 5 with the accommodating cavity 51a in which the slitting device 3 is disposed, the air content at the slitting place of the master electrode plate 210 can be effectively reduced, thereby reducing the risk of combustion of the lithium particles or the other particles generated by slitting, i.e., reducing the risk of sparking at the slitting place of the master electrode plate 210, and effectively improving the safety in the production process of the electrode plates 211. In addition, the accommodating cavity 51a can prevent at least part of the particles from splashing to the outside of the accommodating cavity 51a, such that environment cleanliness in the production process of the electrode plates 211 can be effectively improved, and meanwhile the structural integrity of the electrode plates 211 is improved, thereby improving the work safety of the electrode plates 211 in the subsequent using process.

The specific structure of the protection device 5 is not limited so long as the accommodating cavity 51a capable of containing the slitting device 3 is provided.

In some embodiments, the protection device 5 includes a cover body 51 with the accommodating cavity 51a formed therein. The cover body 51 is provided with an electrode plate inlet 51b and an electrode plate outlet 51c oppositely disposed. The electrode plate inlet 51b is configured to allow the master electrode plate 210 to enter the accommodating cavity 51a, and the electrode plate outlet 51c is configured to allow the slit electrode plates 211 to be pulled out from the accommodating cavity 51a.

Specifically, the structure and pattern of the cover body 51 are not limited so long as the electrode plate inlet 51b and the electrode plate outlet 51b are provided. By arranging the cover body 51, the structure of the protection device 5 can be simplified under the premise of ensuring normal operation of the electrode plate forming apparatus, and the cover body 51 has a better effect of isolation from the external environment, and can collect scrap lithium generated in the slitting process of the master electrode plate 210. The particles splashed into the environment are reduced, thereby reducing the risk of the excessively high content of dust in the environment, and meanwhile the content of the lithium particles in the air is reduced, which is conducive to reducing the risk of explosion after the lithium particles encounter an open fire.

The material of the cover body 51 is not limited so long as the accommodating cavity 51a can be formed therein. In some embodiments, the cover body 51 is made of a visual material. As such, it is convenient to observe the working condition in the process of slitting the master electrode plate 210 by the slitting device 3.

Figure 2:
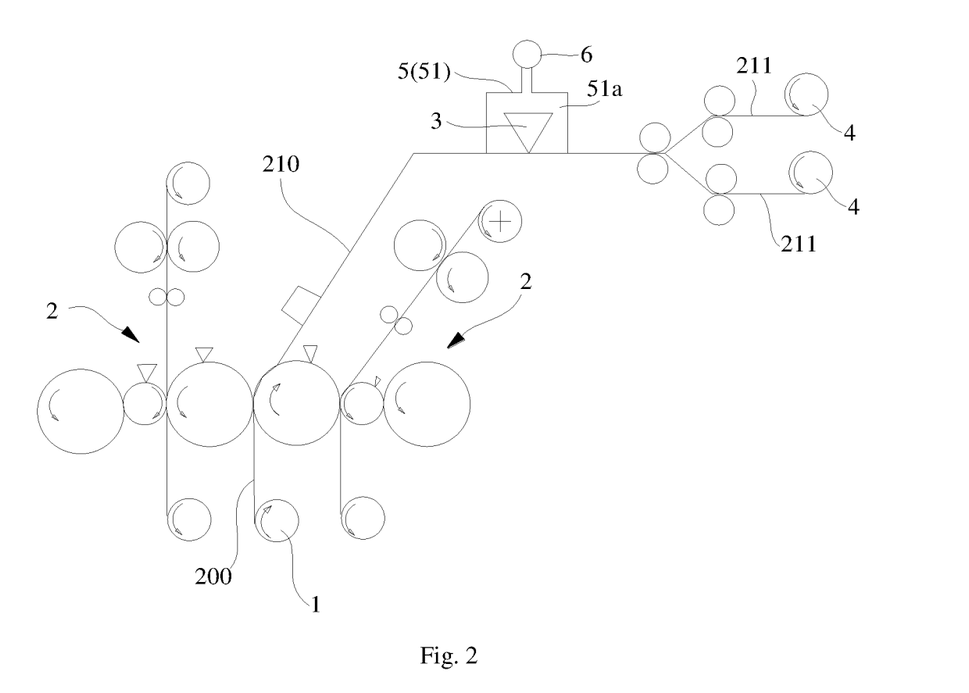
FIG. 2 is a schematic structural diagram of another electrode plate forming apparatus provided by an embodiment of the present application.

In some embodiments, as shown in FIG. 2, the electrode plate forming apparatus further includes a negative pressure device 6. The negative pressure device 6 is configured to suck air in the accommodating cavity 51a.

In the production process of the electrode plates 211, the external air inevitably enters the accommodating cavity 51a. Thus, the provision of the negative pressure device 6 can effectively ensure that the air content in the accommodating cavity 51a is maintained within a preset range, thereby further reducing the risk of sparking at the slicing place of the master electrode plate 210. Specifically, the negative pressure device 6 can be a vacuum pump or an air compressor, etc, can continuously suck the air from the accommodating cavity 51a, and can also intermittently suck the air from the accommodating cavity 51a. The configuration is performed depending on the specific situation.

Figure 3:
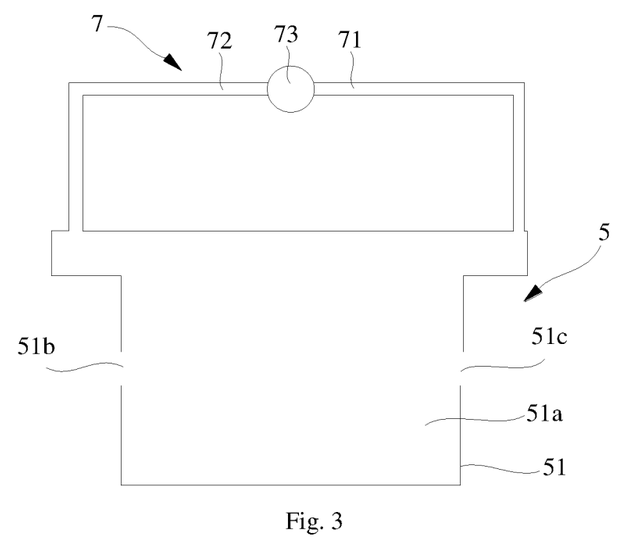
FIG. 3 is a schematic structural diagram of an electrode plate forming apparatus with part of structures omitted provided by an embodiment of the present application.
Figure 4:
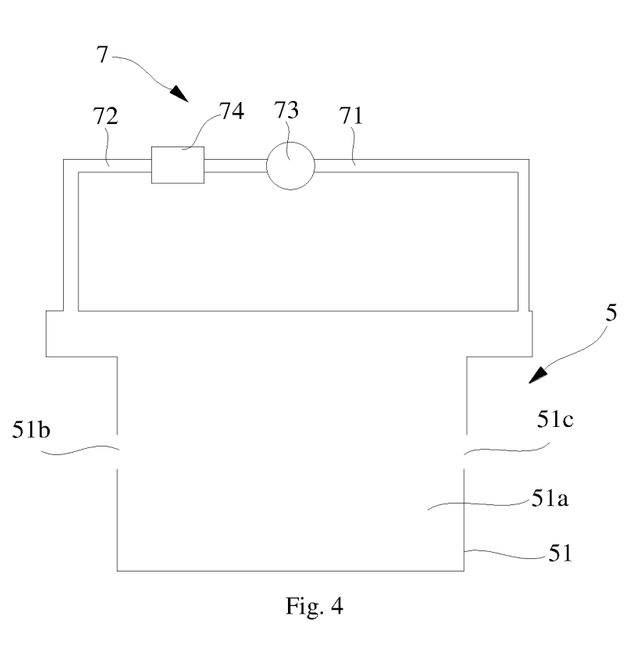
FIG. 4 is a schematic structural diagram of another electrode plate forming apparatus with part of structures omitted provided by an embodiment of the present application.
Figure 5:
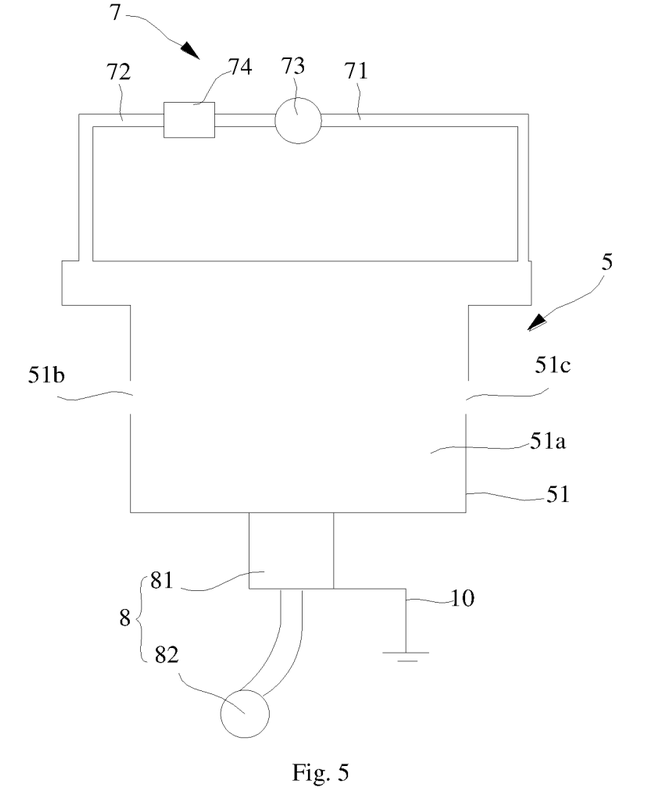
FIG. 5 is a schematic structural diagram of yet another electrode plate forming apparatus with part of structures omitted provided by an embodiment of the present application.
Figure 6:
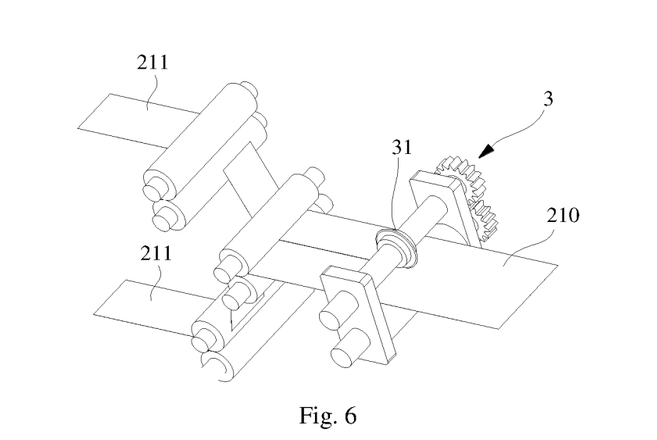
FIG. 6 is a schematic structural diagram of the electrode plate forming apparatus with part of the structures omitted provided by the embodiment of the present application.
Figure 7:
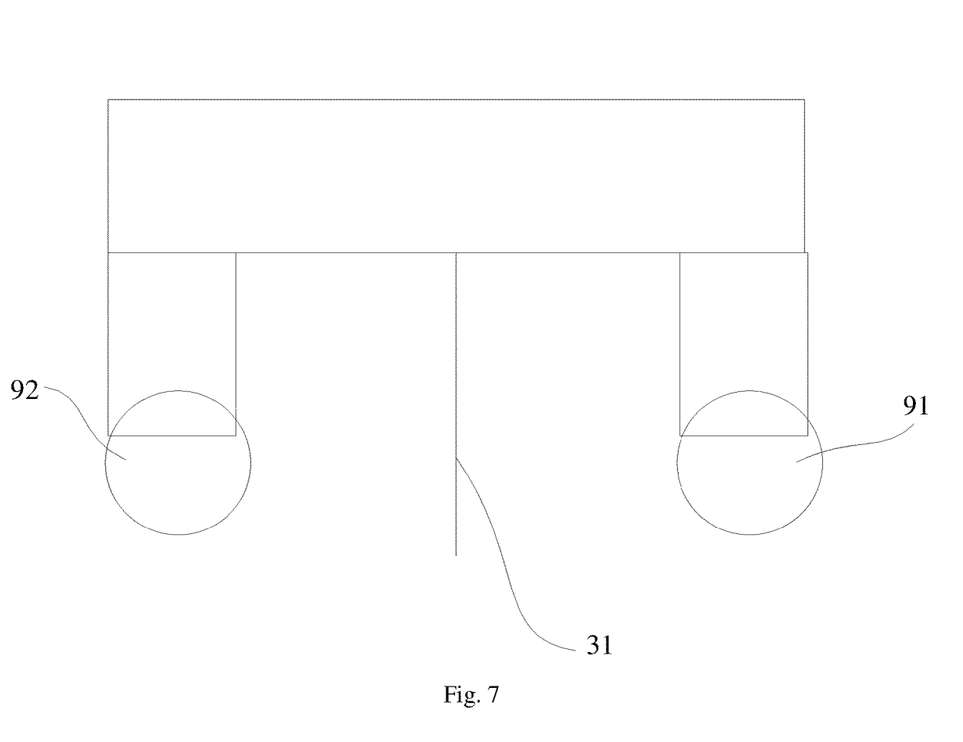
FIG. 7 is a schematic structural diagram of the electrode plate forming apparatus with part of the structures omitted provided by the embodiment of the present application.

In some implementations, as shown in FIG. 3, the electrode plate forming apparatus further includes an inert gas input device 7 communicating with the accommodating cavity 51a. The inert gas input device 7 is configured to input inert gas into the accommodating cavity 51a.

Specifically, the inert gas can be gas such as nitrogen, carbon monoxide or carbon dioxide that is not prone to a chemical reaction at normal temperature or low temperature. The inert gas input device 7 can continuously input the inert gas into the accommodating cavity 51a, and can also input the inert gas into the accommodating cavity 51a at intervals, so as to maintain the air content in the accommodating cavity 51a within the preset range. It can be understood that the inert gas is not prone to reacting with lithium and can drive away gas such as oxygen in the accommodating cavity 51a that is prone to chemically reacting with the lithium particles. As such, the risk of sparking in the slitting process of the master electrode plate 210 is further reduced.

The inert gas input into the accommodating cavity 51a can be normal temperature inert gas or cooled inert gas.

In some alternative embodiments, the cooled inert gas is input into the accommodating cavity 51a. The temperature of the cooled inert air is less than or equal to zero degrees Celsius. As such, after the electrode plates 211 are slit, lithium films on the surfaces of the electrode plates 211 are cooled under the cooling effect of the cooled inert gas. In the subsequent process, the lithium films on the surfaces of the electrode plates 211 are not prone to chemically reacting with the air even if the electrode plates 211 are in contact with the air. As such, activity efficiency of the lithium films on the surfaces of the electrode plates 211 is effectively kept, thereby ensuring electrical performance of the electrode plates 211 in the subsequent using process.

The inert gas input by inert gas input device 7 into the accommodating cavity 51a can be allowed to escape into the air, and can also be recycled. Correspondingly, the inert gas input device 7 is provided with a corresponding structure. There is no limitation herein.

In some embodiments, the inert gas input device 7 includes an input pipeline 71, an output pipeline 72 and a cooling and pumping unit 73. The input pipeline 71 communicates with the accommodating cavity 51a for inputting the inert gas into the accommodating cavity 51a. The output pipeline 72 communicates with the accommodating cavity 51a for outputting the inert air in the accommodating cavity 51a. The cooling and pumping unit 73 is disposed outside the accommodating cavity 51a, the cooling and pumping unit communicates with the input pipeline 71 and the output pipeline 72, for cooling the inert air and supplying power to circular flow of the inert air between the accommodating cavity 51a and the cooling and pumping unit 73.

By arranging in this way, the inert gas is cooled by the cooling and pumping unit 73, then enters the accommodating cavity 51a via the input pipeline 71 to drive away the air in the accommodating cavity 51a, cools the electrode plates 211 and the slitting places of the electrode plates 211, and then flows into the cooling and pumping unit 73 via the output pipeline 72 under the negative pressure of the cooling and pumping unit 73. By circulating in this way, the electrode plates 211 are cooled, and the risk of rubbing sparking in a case of slitting the electrode plates 210 is reduced.

The inert gas can directly enter the cooling and pumping unit 73 via the input pipeline 71. It is also possible to remove the particles or air or the like mixed in the inert gas through filtration, etc. and then deliver the inert gas into the cooling and pumping unit 73. The configuration can be performed depending on the specific situation, which is not limited herein.

In some embodiments, the inert gas input device 7 further includes a filter unit 74. The filter unit 74 is disposed between the output pipeline 72 and the cooling and pumping unit 73 and configured to filter the inert gas.

Specifically, the filter unit 74 can be configured to filter the particles in the inert gas, and can also configured to filter oxygen in the inert gas, or can filter both the particles in the inert gas and the oxygen in the inert gas. The configuration is performed depending on the specific situation, which is not limited herein.

It can be understood that in the process that the inert gas passes through the accommodating cavity 51*a*, the particles generated by slitting the master electrode plate 210 and air from the external environment may be mixed therein. By providing the filter unit 74, the purity of the inert gas can be increased, which is conducive to ensuring the protection effect of the inert gas on performance stability of the electrode plates 211. Meanwhile, the damage caused by the particles generated in the slitting process of the master electrode plate 210 to the cooling and pumping unit 73 is reduced, and the risk of the damage to the electrode plates 211 from the particles entering the accommodating cavity 51*a* along with the inert gas is reduced.

The particles generated in the slitting process of the master electrode plate 210 can be retained in the accommodating cavity 51*a* to be subsequently collected manually, and can also be mechanically collected in the production process of the electrode plates 211.

In some embodiments, the electrode plate forming apparatus further includes a particle collecting device 8 communicating with the accommodating cavity 51*a*. The particle collecting device 8 is configured to collect the particles in the accommodating cavity 51*a*.

By providing the particle collecting device 8, the particles in the accommodating cavity 51*a* can be collected. The risk of production environment cleanliness reduction of the electrode plates 211 caused by the particles in the accommodating cavity 51*a* drifting into the external environment is reduced. And through the particle collecting device 8, centralized treatment of the particles generated in the slitting process of the master electrode plate 210 is also facilitated.

The particle collecting device 8 can be disposed on the upper portion, lower portion or side portion of the slitting accommodating cavity 51*a*, which is not limited herein. As an example, the particle collecting device 8 is disposed on the lower side of the accommodating cavity 51*a*, and the particles more easily fall downwards under the effect of the gravity thereof, such that the particles are conveniently collected.

The specific structure of the particle collecting device 8 is not limited. In some embodiments, the particle collecting device 8 includes a dust suction assembly 81 and a filter assembly 82. The dust suction assembly 81 communicates with the accommodating cavity 51*a* for sucking the particles in the accommodating cavity 51*a*. The filter assembly 82 communicates with the dust suction assembly 81 for filtering out the particles sucked by the dust suction assembly 81.

The provision of the dust suction assembly 81 can more efficiently suck out the particles in the accommodating cavity 51*a*. Whereas, the provision of the filter assembly 82 is conducive to filtering out the particles from a mixture of the gas and the particles sucked out by the dust suction assembly 81 to effectively separate the gas from the particles. As such, it is more convenient to collect the particles generated by slitting the master electrode plate 210.

The particles in the mixture of the gas and the particles sucked out by the dust suction assembly 81 can be directly discharged into the external environment after being filtered out by the filter assembly 82, can also be discharged into the accommodating cavity 51*a* again after being filtered, or are directly discharged to the accommodating cavity 51*a*.

In the embodiment where the electrode plate forming apparatus includes the inert gas input device 7, the dust suction assembly 81 can communicate with the inert gas input device 7, such that the inert gas sucked out by the dust suction assembly 81 is input into the accommodating cavity 51*a* again by the inert gas input device 7. As such, the inert gas can be recycled.

In some embodiments, the electrode plate forming apparatus further includes an electric lead 10. The electric lead 10 electrically connects the particle collecting device 8 with a ground for eliminating static electricity of the particle collecting device 8.

It can be understood that in the process of collecting the particles by the particle collecting device 8, the particles may rub against each other and thus generate static electricity. By configuring the electric lead 10 to electrically connect the particle collecting device 8 with the ground, the static electricity generated by rubbing of the particles is eliminated, and the risk of sparking due to rubbing of the particles is further reduced.

In some embodiments, the slitting device 3 includes a cutter 31. The cutter 31 is configured to slitting the master electrode plate 210.

In some embodiments, the electrode plate forming apparatus further includes a demoulding device 91. The demoulding device 91 is configured to spray a mould release agent to the cutter 31. It can be understood that by spraying the mould release agent to the cutter 31, the risk that the cutter 31 adheres to the electrode plates 211 in the process of slitting the master electrode plate 210, thus affecting the service life of the cutter 31 can be effectively reduced, and meanwhile, the risk that notches are generated at the slit edges of the electrode plates 211, thus breaking the electrode plates 211 is reduced.

In some embodiments, the electrode plate forming apparatus further includes a lubricating device 92. The lubricating device 92 is configured to spray a lubricant to the cutter 31. It can be understood that by spraying the lubricant to the cutter 31 by the lubricating device 92, normal work of the cutter 31 can be effectively ensured, and the lubricant can effectively reduce the temperature of the cutter 31.

Although the present application has been described with reference to some embodiments, various modifications may be made thereto and components therein may be replaced with equivalents without departing from the scope of the present application. In particular, the various technical features mentioned in the various embodiments may be combined in any manner so long as there is no structural conflict. The present application is not limited to the specific embodiments disclosed herein but includes all technical solutions falling within the scope of the claims.

What is claimed is:
1. An electrode plate forming apparatus, comprising:
   an unwinding device, configured to dispose a master electrode plate body;
   a lithium replenishment device, configured to clad a lithium strip to a surface of the master electrode plate body and form a master electrode plate;

a slitting device for slitting the master electrode plate into a plurality of electrode plates;

a plurality of winding devices, configured to pull the electrode plates to travel, each of the winding devices winding one corresponding electrode plate; and a protection device, provided with an accommodating cavity in which the slitting device is disposed, and configured to at least partially separate particles from an external environment in a case that the slitting device slits the master electrode plate and generates the particles.

2. The electrode plate forming apparatus according to claim 1, wherein the protection device comprises a cover body with the accommodating cavity formed therein, the cover body being provided with an electrode plate inlet and an electrode plate outlet oppositely disposed, the electrode plate inlet being configured to allow the master electrode plate to enter the accommodating cavity, and the electrode plate outlet being configured to allow the slit electrode plates to be pulled out from the accommodating cavity.

3. The electrode plate forming apparatus according to claim 1, wherein the electrode plate forming apparatus further comprises a negative pressure device, the negative pressure device being configured to suck air in the accommodating cavity.

4. The electrode plate forming apparatus according to claim 1, further comprising:

an inert gas input device communicating with the accommodating cavity, the inert gas input device being configured to input inert gas into the accommodating cavity.

5. The electrode plate forming apparatus according to claim 4, wherein the inert gas input device comprises:

an input pipeline, communicating with the accommodating cavity for inputting the inert air into the accommodating cavity;

an output pipeline, communicating with the accommodating cavity for outputting the inert air in the accommodating cavity; and a cooling and pumping unit, disposed outside the accommodating cavity, the cooling and pumping unit communicating with the input pipeline and the output pipeline, for cooling the inert air and supplying power to circular flow of the inert air between the accommodating cavity and the cooling and pumping unit.

6. The electrode plate forming apparatus according to claim 5, wherein the inert gas input device further comprises a filter unit, the filter unit being disposed between the output pipeline and the cooling and pumping unit and configured to filter the inert gas.

7. The electrode plate forming apparatus according to claim 1, wherein the electrode plate forming apparatus further comprises a particle collecting device communicating with the accommodating cavity, the particle collecting device being configured to collect the particles in the accommodating cavity.

8. The electrode plate forming apparatus according to claim 7, wherein the particle collecting device comprises:

a dust suction assembly, communicating with the accommodating cavity for sucking the particles in the accommodating cavity; and a filter assembly, communicating with the dust suction assembly for filtering out the particles sucked by the dust suction assembly.

9. The electrode plate forming apparatus according to claim 7, wherein the electrode plate forming apparatus further comprises an electric lead, the electric lead electrically connecting the particle collecting device with a ground for eliminating static electricity of the particle collecting device.

10. The electrode plate forming apparatus according to claim 1, wherein:

the slitting device comprises a cutter, the cutter being configured to slit the master electrode plate; and the electrode plate forming apparatus further comprises a demoulding device, the demoulding device being configured to spray a mould release agent to the cutter; and/or, the electrode plate forming apparatus further comprises a lubricating device, the lubricating device being configured to spray a lubricant to the cutter.

* * * * *